May 18, 1954  R. C. ROOT  2,678,726
MACHINE FOR GRADING EGGS AND THE LIKE ACCORDING TO WEIGHT
Filed Feb. 4, 1949  5 Sheets-Sheet 1

May 18, 1954  R. C. ROOT  2,678,726
MACHINE FOR GRADING EGGS AND THE LIKE ACCORDING TO WEIGHT
Filed Feb. 4, 1949  5 Sheets-Sheet 2

Inventor
Ralph C. Root
By Albert H. Kirchner
Attorney

May 18, 1954  R. C. ROOT  2,678,726
MACHINE FOR GRADING EGGS AND THE LIKE ACCORDING TO WEIGHT
Filed Feb. 4, 1949  5 Sheets-Sheet 5

Ralph C. Root Inventor

By Albert H. Kirchner
Attorney

Patented May 18, 1954

2,678,726

UNITED STATES PATENT OFFICE 2,678,726

MACHINE FOR GRADING EGGS AND THE LIKE ACCORDING TO WEIGHT

Ralph C. Root, Columbus, Ind.

Application February 4, 1949, Serial No. 74,593

10 Claims. (Cl. 209—121)

The present invention relates to machines for grading articles according to weight and more particularly to such machines as are especially intended for use in grading eggs.

A primary object of the invention is to effect improvements in the general arrangement and mechanical details of machines of the general type which forms the subject of United States Patent No. 2,279,947 issued to Everett M. Keen on April 14, 1942, in which a plurality of articles such as eggs of random weight are passed successively over a series of scales and are diverted into segregated groups in which the eggs have equal unit weight within narrow limits.

As in the patented construction, the present improvement includes power means for propelling the articles (hereinafter called eggs although other objects, such as fruit, vegetables, nuts and even packaged material may be handled) successively in intermittent or step-by-step movement to a stationary position at each of a series of stations where they are weighed and, if their weight is above a particular predetermined minimum, are discharged, or, if below such weight, are moved on to the next successive station for another weighing operation.

General objects of the invention are to provide a grader of the foregoing type which will be more sensitive and accurate in its classifying action, which will be faster in operation, which will be gentler in handling such fragile objects as eggs so that none will be in danger of being cracked or broken, which will be proof against jamming or stalling when eggs which exactly balance the counterweights come to rest on the scales, and which will be structurally simple, inexpensive to make and assemble, durable in use, and entirely foolproof and dependable in operation.

Other and further objects and advantages of the invention will, it is believed, be sufficiently evident to those skilled in the art from a consideration of the present disclosure of an embodiment which has been reduced to actual practice and thoroughly tested and found to be entirely satisfactory and which is therefore at present preferred. This embodiment is illustrated in the accompanying drawings, in which.

The general nature of the present improvements will be explained as the illustrated embodiment is described, and the essential principles of the improvements will be pointed out in claims following the description.

The construction of the preferred embodiment includes a panel 1 rising from the front edge of a base 2 and constituting, with the addition of a rear panel 3 and preferably integral end walls 4 and top wall 5, a cabinet which can be made of sheet metal and mounted on a support 6 of convenient height. As here shown, the support is a table or cabinet having space in its bottom for receptacles into which the graded eggs may be put, and having a top surface divided by partitions 7 into bins 8 into which the several sizes of eggs are discharged by the machine. The support itself forms no part of the present invention.

Figure 1:
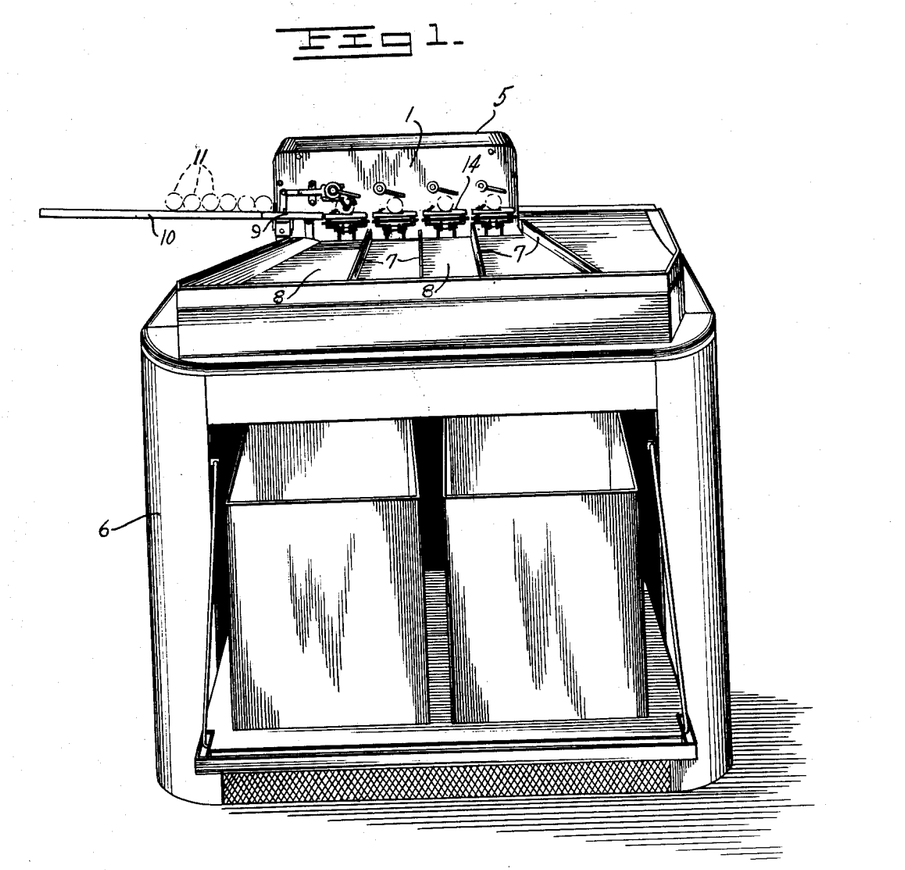
Fig. 1 is a perspective view of the preferred embodiment mounted on a stand or cabinet providing collecting bins for the graded eggs and storage space for crates into which they may be packed.
Figure 2:
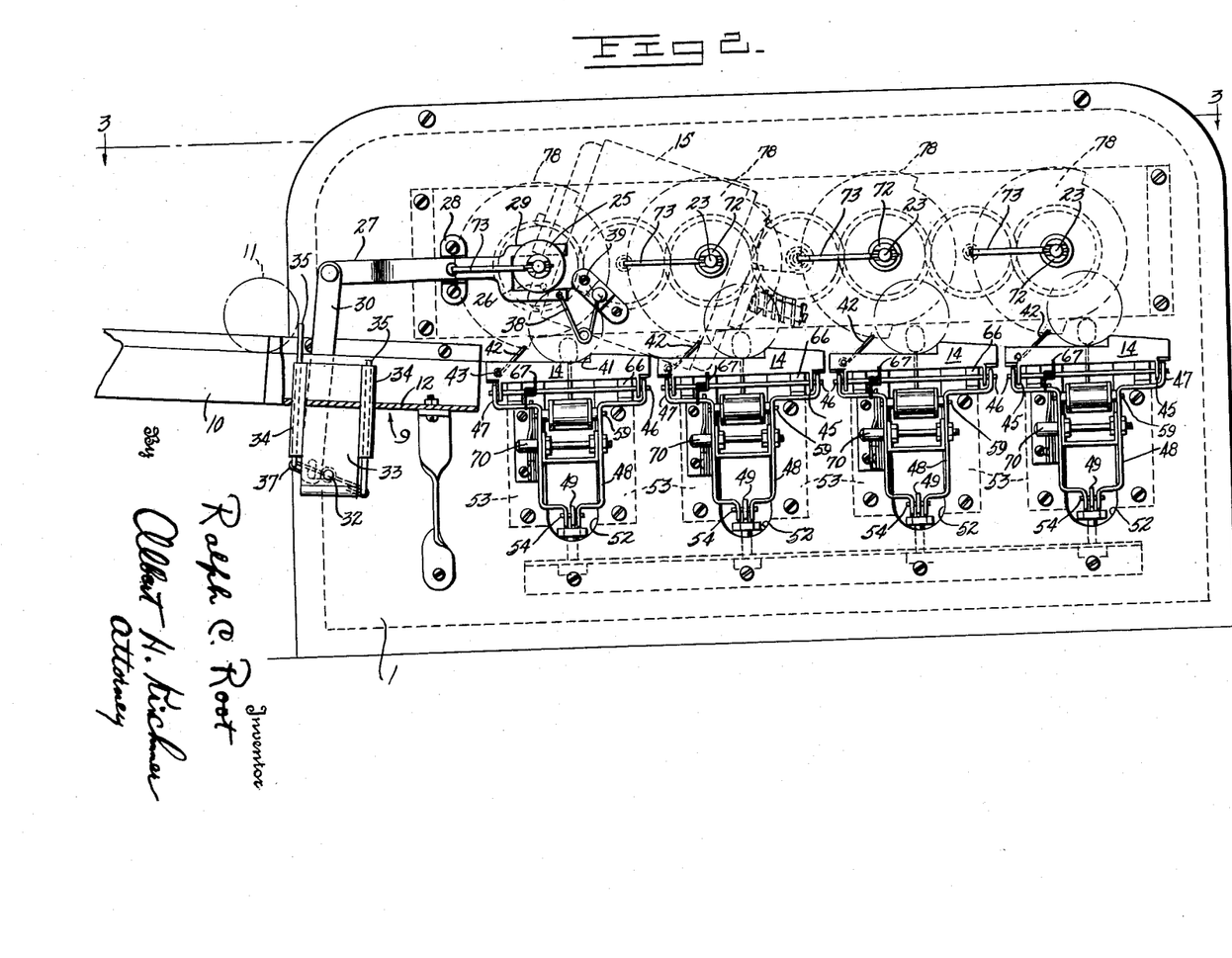
Fig. 2 is a front elevational view of the grader.
Figure 3:
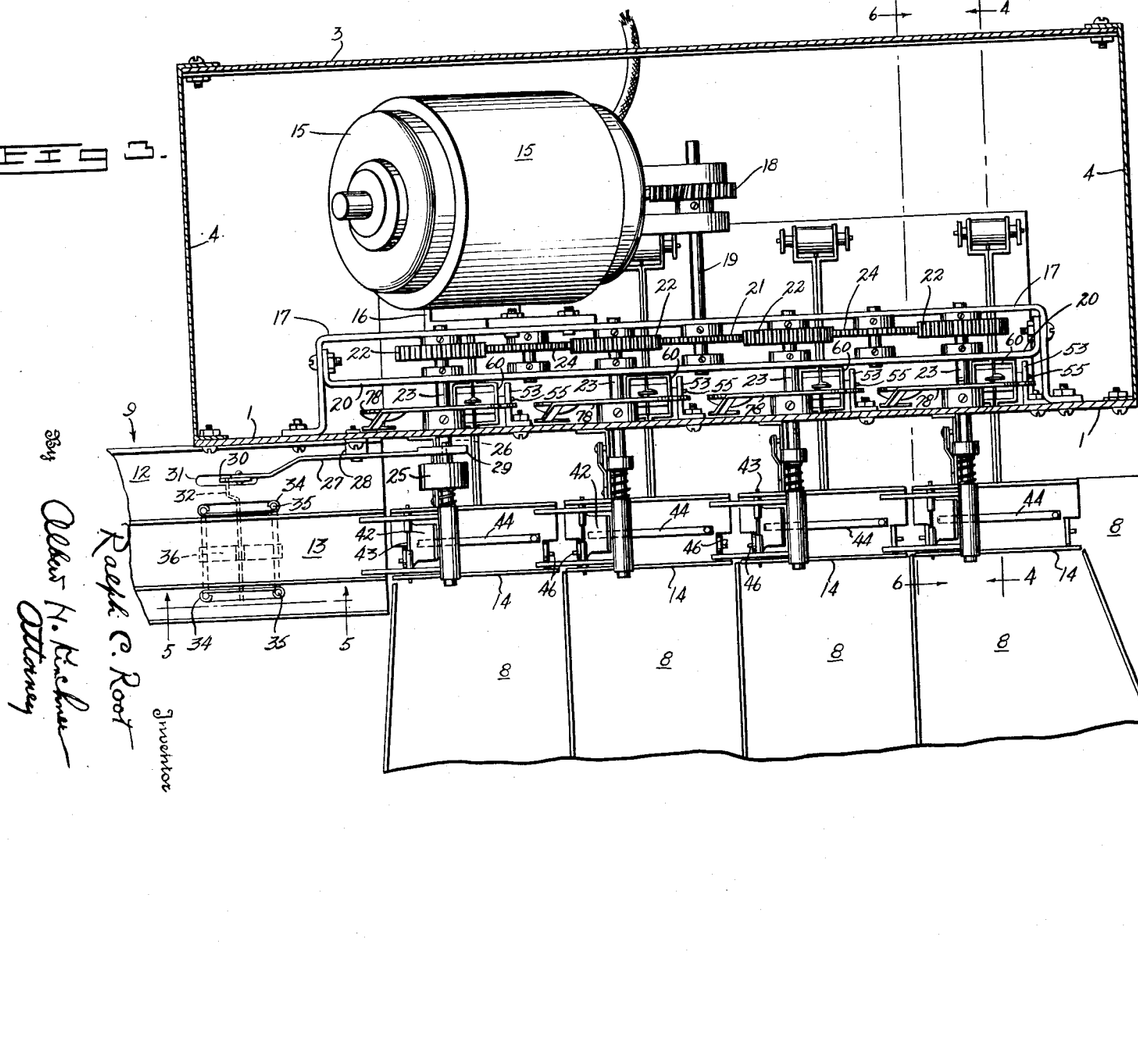
Fig. 3 is a top plan view of the mechanism taken sectionally through the upper zone of the casing on the line 3—3 of Fig. 2.

Secured as by bolting and bracketing to the front surface of the panel 1 at its lefthand side as viewed in Figs. 1, 2 and 3, is a short feed runway 9 which may be the righthand end of, or be connected to the righthand end of, a loading runway 10 on which eggs 11 may be placed. The runway 9 is made of a base plate 12 having its front edge flanged for stiffness and its rear edge similarly flanged for stiffness and to provide a convenient means for attaching the plate to the panel 1 and a channel 13 secured lengthwise along the center top of the base plate. The channel flanges are upturned to provide a pair of rails and these rails are properly spaced and the channel or runway is downwardly inclined so that eggs will roll down the rails from left to right by gravity.

Adjacent to the righthand end of the channel 13 is the first of a tandem series of weighing stations, here shown as four in number, each including a weighing pan 14. Each pan comprises an upturned channel having parallel spaced side rails aligned with the rails of the runway 9 so that the eggs may roll from the runway on to the first pan and thence successively on to more or less of the whole series of pans depending on the weight of the egg. As will be explained more fully hereinafter, each pan is pivoted and mounted on a weighing beam so that it will swing to discharge laterally a sufficiently heavy egg and will remain stationary under the weight of a lighter egg so as to support such egg for movement to the next adjacent pan of the series or for movement longitudinally off the last pan. In this way the eggs are separated according to weight into the several bins 8.

The present invention provides useful improvements principally in the means for feeding the eggs to the pans, in the means for propelling the eggs over the pan series, and in the weighing mechanism and pan structure and mounting. These improvements will now be described.

The machine is power operated by an electric motor 15 supported by a bracket 16 which is mounted on the rear of a plate 17 which has its ends turned forwardly and flanged outwardly and bolted to the back of the panel 1, all as best shown in Fig. 3. Through a worm gear and pinion 18 this motor turns at considerably reduced speed (say a 50 to 1 ratio) a main drive shaft 19 which is journalled in the plate 17 and in an intermediate plate 20 paralleling the same about midway between it and the panel 1. A main drive gear 21 fast on the end of this shaft is meshed at its opposite sides with a pair of gears 22 each of which is fast on a shaft 23 which is journaled in the plates 17 and 20 and the panel 1 and projects forwardly through the panel to overlie the forward end portion of one of the pans 14. Idler gears 24 on stub shafts mounted in the plates 17 and 20 are meshed with the two gears 22 thus far mentioned and with additional gears 22 fixed on additional shafts 23 mounted as has been explained so as to complete the complement of gearing and shafting for the four-station machine which has been selected to illustrate the invention. A smaller or larger number of stations will of course require fewer or more gears, shafts, pans, etc. In any event the arrangement is such that the motor drives all the shafts at reduced speed in the same direction, which is counterclockwise as viewed in Fig. 2.

The leftmost shaft 23, mounted over the first pan 14, is equipped with a fast collar 25 spaced in front of the panel 1, and a pin 26 (see Figs. 2 and 3) projects eccentrically from this collar into the space between the collar and the panel to give oscillating motion to a rocker arm 27 which is fulcrumed at about its middle on a bracket 28 attached to the front of the panel 1 and has a fork 29 fitting over the shaft 23 and pin 26.

This rocker arm 27 drives an escapement mechanism for feeding eggs from the loading runway 10 on to the feed runway 9 intermittently, at spaced intervals, one egg at each complete revolution of the shafts 23. This mechanism is completed by a link 30 pivotally depending from the forward end of the rocker arm 27 and penetrating a slot 31 in the base plate 12 behind the egg-supporting channel 13 of the runway 9. The lower end of this link is slotted to receive the cranked or eccentrically bent inner end of a short rockshaft 32 which is journaled in the legs of a U-shaped bracket 33 depending from the base plate 12. These legs are provided at their edges with roller tubular beads 34, four in number, which serve as vertical bearings or guides for egg holding and releasing pins 35. The foremost or lefthand pair of pins are connected together at their lower ends, being indeed simply the vertical legs of a piece of stout wire stock which is bent to U-shape, and the rearmost or righthand pair are made in the same way. The two pairs are connected by a rocker arm 36 which has its mid portion fixed to the rockshaft 32 and has its ends looped as shown at 37 about the bights or horizontal portions of wire which connect the pins 35 of each of the pairs of pins.

The lateral spacing between the pins of each pair, the longitudinal spacing between the pairs, and the height of each pin, are all selected so that reciprocation of the link 30 will elevate and lower the pins of the pairs successively above and below the rails of the channel 13 so that the foremost pair of pins will first be elevated to stop the leading egg supplied from the runway 10, as shown in Fig. 2 and will then be lowered to release that egg to be stopped by the simultaneous rising of the rear pair of pins, and so that when the rear pins are lowered to release the egg from the runway 9 on to the first scale pan 14 the foremost pins will simultaneously rise between that egg and the next succeeding egg on the runway 10 to hold the latter for release on repetition of the cycle. In this way eggs which are manually placed on the runway 10 and are fed down the same by gravity are released at regular intervals on to the first pan 14, one egg at each complete revolution of each shaft 23.

An important feature of the escapement mechanism which has just been described is the provision of means by which the pairs of pins 35 move up and down rapidly, by snap action, instead of gradually. This is accomplished by the spring 38 (see Fig. 2) which reacts in tension between an anchorage 39 secured to the panel 1 and one of the legs of the fork 29 of the rocker arm 27, and by elongating the slot 40 which the cranked end of the rockshaft 32 penetrates in the link 30. The arrangement is such that the spring biases the rocker arm to one side or the other about dead center of its fulcrum on the bracket 28 so that, with the pin 26 revolving counterclockwise about the axis of its shaft 23, when the rocker arm passes dead center on descent of the pin, the spring will snap the fork down and the link up to abruptly elevate the foremost pair of pins 35 and lower the rearmost pair, and when the rocker arm passes dead center on ascent of the pin 26, the spring will snap the fork up and the link down to abruptly lower the foremost pair of pins and elevate the rearmost pair. It will be appreciated that the lost motion connection of the link and crank pin provided by the elongated slot 40 contributes to this action by permitting the link to reciprocate idly to some extent before imparting any movement to the rockshaft 32.

Figures 4, 5:
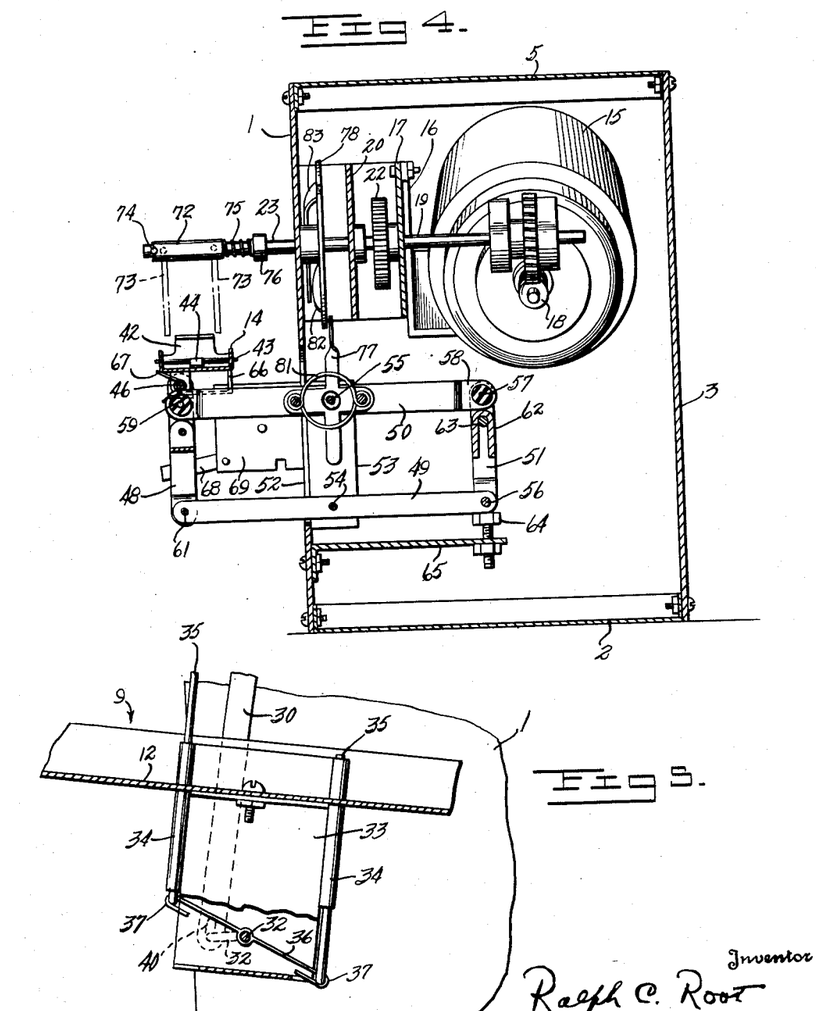
Fig. 4 is a vertical cross sectional view taken on the line 4—4 of Fig. 3 showing certain of the parts in end elevation, with the mechanism of a weighing station shown in egg-retaining position.
Fig. 5 is a detail sectional view, taken on the line 5—5 of Fig. 3, of the escapement mechanism for supplying eggs to the first weighing station of the series.

In the position of the parts shown in Fig. 5, the pin 26 has descended to depress the rocker arm fork below dead center, the link 30 has been jerked suddenly up, the shaft 32 and rocker arm 27 have been rocked clockwise to lift the foremost pair of pins 35 and lower the rearmost pair, and the shaft 23 has continued its counterclockwise rotation sufficiently to bring the pin 26 down against, or almost against, the lower leg of the fork 29, as is evident in Fig. 2, with none of this continued rotation affecting the positions of the pins 35. These pins remain in the same position through enough rotation of the shaft 23 to bring the rising pin 26 up against the upper leg of the fork. Thereupon the link 30 begins to move downwardly, but this motion is at first lost in the slot 40 and hence does not affect the rockshaft 32. However, by the time the shaft 23 has rotated enough to seat the upper end of the slot 40 against the cranked end of the rockshaft 32, the ensuing further rise of the pin 26 lifts the fork 29 to swing that end of the rocker arm 27 above the fulcrum center point, whereupon the spring 38 suddenly lifts the fork and the consequent descent of the link 30 swings the rockshaft 32 counterclockwise to snap the foremost pins 35 down and the rearmost pins up.

The snap action of a complete cycle of this operation, it will be appreciated, releases from the runway 9 the egg that has been trapped between the two pairs of pins 35 while the foremost pair rise so quickly that the next egg from the runway 10 is kept from rolling between the pairs until the next snap movement of the pins, at which time said next egg is admitted between the pin pairs and caught there by the quickly rising rear pins. The arrangement is therefore such that on each complete revolution of the shafts 23 an egg is released from the runway 9 to the adjacent or first of the weighing pans 14. The structure and mode of operation of these weighing pans will now be described.

As has been heretofore stated, each pan 14 comprises an upturned channel having parallel side rails. The side rails of each pan are aligned with those of the next adjacent pan, and those of the first pan are aligned with the rails of the runway 9, so that all the rails, of the runways 10 and 9 and of all the pans, comprise a track along which the eggs may be rolled. All the pans and their appurtenant weighing and discharging structure are identical, except only for the value of the weights with which they are counterbalanced. It is sufficient therefore to describe only one of the pans and its related mechanism, comprising together one of the weighing stations.

As best shown in Figs. 2, 3, 4 and 6, each weighing station includes a pan 14 whose rails are downwardly inclined, from left to right, in two stages separated by a low vertical shoulder 41 which serves as a stop for the eggs. To slow the movement of an onrolling egg and bring it quickly to a stop without shock or the possibility of damage or rebound the leading edge of each pan is provided with a snubber plate 42 pivoted on a shaft 43 mounted in the pan rails and maintained in upwardly and rearwardly inclined position by a light leaf spring 44 which has its rear end riveted to the rear portion of the pan floor. The tension of this spring is small enough to be overcome by the weight of the lightest egg, so that the snubber plate will be depressed between the pan rails, slowing the egg to a stop against the shoulders 41 with the free end of the snubber plate promptly rising behind the egg to serve as an abutment preventing rebound of the egg and holding it motionless between the plate and the shoulders, as shown in Fig. 2, for the ensuing weighing operation.

Each pan has a pair of ears 45 depending from its bottom along the front edge thereof near its left and right ends, and these ears are apertured longitudinally of the pan to receive a long pin 46 which penetrates also a pair of ears 47 turned up from the ends of a pan supporting frame 48. This frame is generally of inverted U-shape in front elevation as seen in Fig. 2 and constitutes the front member of a sort of parallel linkage assembly which includes a lower beam 49, an upper beam 50, and a rear frame 51. As shown in Fig. 4, the beams 49 and 50 project back through a vertically elongated opening 52 cut in the front panel 1 between a pair of rearwardly projecting bracket plates 53, the lower beam being pivoted to the plates by a pin 54 and the upper beam being pivoted thereto by a pin 55, both set through the plates. The rear frame 51 is of inverted U-shape, much like the front frame 48. Its two legs are brought together at their bottoms where they are pin-connected, as shown at 56, to the back of the lower beam, and are spread apart at their upper ends where they are connected by a pin 57, bushed in rubber, to a clevis 58 formed on the end of the upper beam 50. This upper beam is conveniently made in the form of strips riveted or bolted together, these strips being separated at the rear to form the clevis 58, and separated at their forward ends to fill the space between the legs of the frame 48 and pass a rubber bushed pin 59 for making this connection, and separated at their mid point to form a box enlargement 60 which is pivoted by a pin to the bracket plates 53. The lower beam 49 is pin connected to the front frame 48 at 61, thus completing the parallel linkage assembly.

It will be evident that as the two beams 49 and 50 rock about their pivots 54 and 55, the front and rear frames 48 and 51 will rise or fall in vertical parallelism. It is this entire linkage that constitutes the weighing beam, and to this end a counterweight 62, in the form of a U-shaped piece of strap lead, is hung over a cross bar 63 which connects the members of the rear frame. To limit the undepressed position of the linkage beam to one in which the rails of the pan 14 supported by the linkage are at the same height as that of all the other rails of the entire track, a setscrew 64 is made adjustable in a shelf 65 directly under the rear frame 51. To keep the pan 14 leveled on the front frame 48, this frame has a pair of arms 66 projecting backwardly from the legs thereof, just inside the ears 47, and the pan is yieldably held down on these arms by a light coil spring 67 wrapped around the pin 46 and having its ends engaged in tension with the front of the pan and of the frame 48.

It will be appreciated that the arrangement just described is such that each pan is normally supported in the line of the entire trackway for straight lowering movement under the weight of an egg which is heavier than the weight for which the pan is counterweighted and that the pan is capable of being tilted forward to discharge an egg upon the weight of the egg and pan and the tension of the spring 67 being overcome. It will be evident also that under the weight of an egg which is not heavy enough to depress the pan, the weighing beam will not rock and the pan will remain undepressed so that the egg may be rolled along it and longitudinally off its rear end. The mechanism for tilting the pan to discharge a sufficiently heavy egg will now be described.

Figure 6:
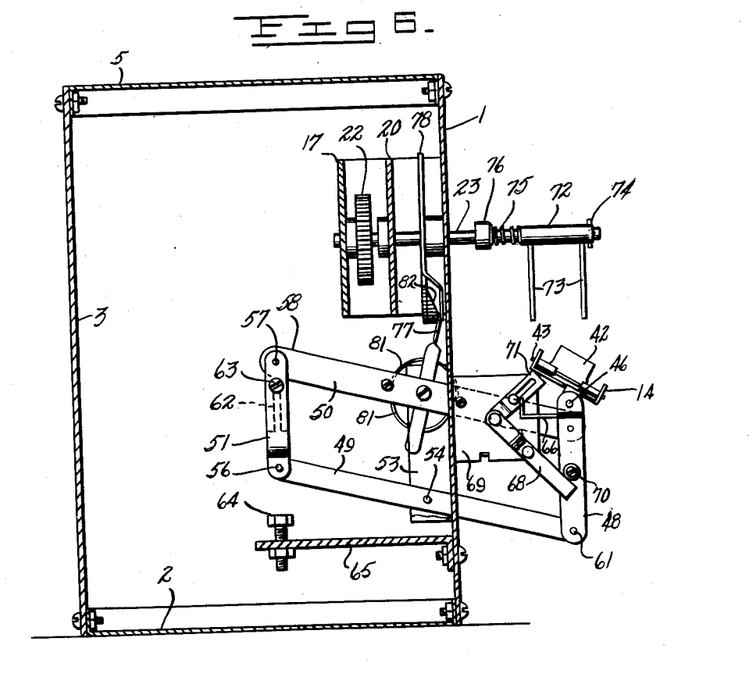
Fig. 6 is a vertical cross sectional view taken on the line 6—6 of Fig. 3 showing certain of the parts in end elevation as in Fig. 4 but differing from Fig. 4 by showing the mechanism of a weighing station in egg-discharging position.
Figure 7:
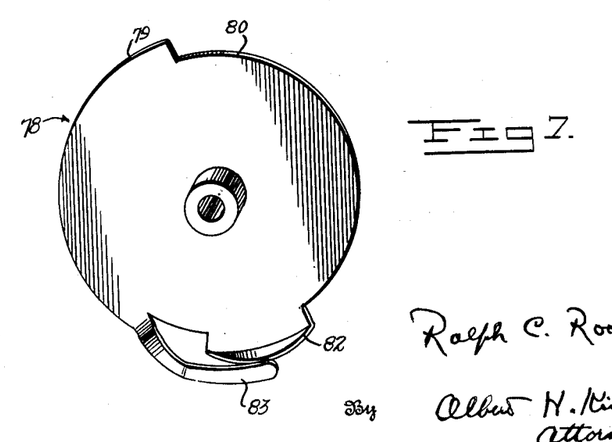
Fig. 7 is a perspective view of one of the scale-tripping cam discs.

This mechanism includes a lever 68 pivoted to a bracket 69 projecting forwardly from the panel 1 so that the lever can be rocked to swing its rear end up when its front end is engaged by a stud 70 projecting laterally through one side of the front frame 48 as an extension of a pin which is fixed in that frame. To the rear end of the lever is pin-connected a push bar 71 which is guided by a pin fixed in the bracket 69 and penetrating a slot in the push bar to bring the bar up against the rear of the pan bottom as the pan and its supporting frame 48 descend. Fig. 6 shows the action of these parts to tilt the pan forwardly and thus discharge an egg. By means of this mechanism descent of the pan automatically causes it to tilt forwardly and discharge the egg whose weight made the pan descend.

To propel the eggs through the machine by an intermittent movement providing for a pause at each weighing station the following mechanism is employed:

That portion of each of the shafts 23 which projects forwardly from the panel 1 is provided with a sleeve 72 from which a pair of parallel spaced fingers or prongs 73 radiate in approximately the planes of the two pan rails so as to sweep, on each revolution of the shaft, over the pan and lift any egg which may be resting against the shoulders 41 and roll it along and off the righthand end of the pan on to the lefthand end of the next pan in the series or, in the case of the last pan, into the extreme righthand bin 8.

In order to make the propelling force of the fingers 73 yieldable, so as not to crush any egg that for any reason may become jammed on the pan or may be prevented from being rolled along the pan, the sleeves 72 are loose on the shafts 23 but normally rotate therewith through a connection consisting of an abutment in the form of a small pin 74 standing diametrically through the end portion of each shaft against which a pair of shallow notches in the end of the sleeve are pressed by a light coil spring 75 reacting between the inner end of the sleeve and another abutment in the form of a collar 76 fixed on the shaft or, in the case of the first shaft, which operates the rocker arm 27, the collar 25. Unusual resistance offered by any egg to movement along its pan thus simply springs the sleeve notches back out of their seating engagement on the pin 74 and the fingers 73 remain pressed lightly against the egg while the shaft turns idly in the sleeve.

The machine includes mechanism for keeping the pans from descending while the eggs are being rolled onto them and for holding the pans supported until the eggs have come to rest. In this way each egg is accurately weighed because the pans are lowerable only in response to the actual static weight of a stationary egg and not in response to such weight plus or minus any impact force of the rolling egg or of any downward or upward component in the thrust from the fingers 73. Moreover, there is no possibility of any pan being lowered under the combined weights of an oncoming egg and an offgoing egg that may be simultaneously on the two end portions of the pan. This feature of the machine includes the following mechanism:

Upstanding from the box enlargement 60 of each upper beam 50 is a spring finger 77 which has its upper end portion disposed in a plane parallel to that of the panel 1 and which swings toward and from the panel as the beam rocks. This path of swinging movement of the finger is obstructed by a cam disc 78 which is fixed on each shaft 23 and which is so shaped as to prevent forward movement of the finger, and hence lowering of the pan 14, during that part of the revolution of the shaft 23 which takes place while the fingers 73 are moving an egg on to the pan and the egg is coming to rest against the shoulders 41. To this end the cam disc has a radially enlarged portion 79 which obstructs passage of the finger 77, followed by a radially reduced portion 80 which permits the finger to pass. The finger is made of very thin spring steel, which may be supported and stabilized by a spring wire 81 secured to the beam 50 and having upper and lower looped portions against which the finger 77 bears, so that if the weight of an egg should be just sufficient to swing the finger 77 into the plane of the cam disc 78, the finger will be deflected to the front or rear and no jamming of the machine or damage will result.

If the weight of an egg is insufficient to lower the pan on which it is resting, the finger 77 is not swung forwardly and the egg remains on the pan through a full revolution of the shaft 23 to be propelled to the next pan by the next descent of the fingers 73. If, however, the weight of the egg is great enough the finger 77 swings forwardly past the edge of the reduced portion 80 of the cam disc until the front frame 48 of the weighing mechanism descends the full distance permitted by the seating of the lower end of the slot in the push bar 71 against the pin in the bracket 69, which operation tilts the pan and discharges the egg directly into the bin 8 in front of the pan. If, however, the weight of the egg is just sufficient to balance the counterweight 62 or other weight with which the beam 50 may be loaded, so that the finger 77 just passes beyond the cam disc 78, continued rotation of the disc brings the inclined nose of a flange 82 formed on the periphery of the disc into engagement with the finger and pushes the finger forwardly the full distance required to discharge the egg. The finger 77 then swings back by gravity of the counterweight past the flange 82 and through the plane of the cam disc. If for any reason the parts catch, their prompt return to original position is insured by the arm 83 which extends from the periphery of the cam disc behind the flange 82 and is curved to bear against the front face of the forwardly moved finger 77 and push it positively back through the plane of the cam disc as the latter continues its rotation.

In the foregoing way the mechanism is made very sensitively responsive to predetermined adjustments and very accurate in requiring each of the several pans to discharge all eggs that weigh even minutely more than the weight for which the pan is set and in preventing discharge of any egg that weighs even slightly less than such weight.

The weighing stations are of course graduated from first to last (left to right as shown in the drawings) with the counterweights arranged in a descending scale so that the heaviest eggs will be discharged at the first station and the lightest eggs will pass longitudinally off the last pan and eggs of intermediate weight will be discharged at the intervening stations. To effect this graduated adjustment the counterweights 62 are conveniently made of varying lengths of strap lead of uniform thickness and width. Each weighing station can be accurately calibrated, if desired, by adding small wire hooks (not shown) to the counterweights or by hanging such hooks on the pin in the front frame 48 which terminates in the stud 70.

To summarize briefly the operation of the machine:

Once during each revolution of a shaft 23 the escapement mechanism releases an egg 11 from the runway 9 to roll on to the pan 14 of the first weighing station in such timed relation to the cyclic operation of all the parts that the egg will pass the snubber plate 42 and come to rest against the pair of shoulders 41 before the fingers 73 have a chance to swing against it in their counterclockwise movement. During this movement of the egg the pan is held against lowering because the enlarged portion 79 of the cam disc 78 stands in the way of the finger 77. If the weight of the egg is greater than that for which this first weighing station is set, the finger 77 will pass forwardly through the cam disc plane as soon as the reduced portion 80 of the cam disc turns into alignment with the finger, and thereafter the finger will at once move forwardly its full permissible distance or it will be forced to the limit of possible movement as soon as it becomes engaged by the flange 82 on the cam disc. In either case the front frame 48 of the scale mechanism descends and the push bar 71 tilts the pan forwardly to discharge the egg into the adjacent bin 8, after which the parts are restored by gravity or by the arm 83 to their original positions. If, however, the egg is lighter than the weight for which this first weighing station is set, no lowering movement of the pan is initiated and the pan remains elevated during the entire rotation of the shaft 23. Near the end of the first complete rotation of this shaft, the fingers 73 swing down against the lefthand side of the egg and push it over the shoulders 41 endwise off the pan onto the pan of the next weighing station where the cycle is repeated. During this movement of the egg the pans are rendered inoperative by the cam discs 78 preventing swinging movement of the fingers 77 so that no pan can discharge even though a second egg reaches it before the first egg has been rolled endwise off it.

The principles of the invention as defined in the appended claims are capable of being incorporated in various modifications of the preferred structure which has been selected in this application to illustrate those principles. However, the illustrated construction embodies certain refinements of the basic principles which I regard as having considerable value in themselves. Thus, for example, to mention but one advantage of the arrangement in the precise form which has been depicted and described, it will be noted that most of the parts can be made as sheet metal stampings, and that while the complete structure comprises numerous individual parts, many of those parts are exact duplicates of each other so that manufacturing the machine requires the use of no more than a comparatively small number of dies.

I claim:

1. In a machine for grading eggs and the like according to weight, a weighing station comprising a pan on to which an egg may be rolled, abutment means on the pan for stopping the egg to be weighed, a snubber plate mounted on the pan in the path through which an oncoming egg rolls to the abutment means and means yieldably disposing the snubber plate in upwardly inclined position for slowing the movement of said egg, the plate having its normally upper end spaced from the abutment means sufficiently to admit an egg in said space, whereby the plate is adapted to return to upwardly inclined position behind an egg on the pan and hold said egg against rebounding.

2. In a machine for grading eggs and the like according to weight in which the eggs are rolled along the length of a weighing station pan having a surface for supporting the eggs and an abutment for stopping each egg preparatory to weighing it, the combination therewith of a pan, means for rolling an egg on the pan, an abutment for stopping said egg on the pan, means for snubbing the movement of said egg to reduce its impact with the abutment and prevent rebound therefrom comprising an upwardly and rearwardly inclined plate mounted on the pan in the path of movement of the eggs anterior to the abutment, and spring means supporting the plate in inclined position yieldable under the weight of an egg to cause the plate to be depressed and leave the egg free to roll at reduced speed over the plate to the abutment, the plate having its normally upper end spaced from the abutment sufficiently to admit an egg in said space, whereby the plate is adapted to return to upwardly inclined position behind an egg on the pan and hold said egg against rebounding.

3. In a machine for grading eggs and the like according to weight in which the eggs are propelled by power means along a path including a weighing station pan, the combination therewith of a propelling device comprising a rotatable shaft projecting transversely above said path, a sleeve mounted on the shaft, an egg-engaging finger radiating from the sleeve, and a slip connection between the sleeve and shaft for constraining the sleeve and shaft to turn normally together but making them free to yield under the influence of excessive resistance to movement of the finger so that the shaft may turn relatively to the sleeve.

4. The combination claimed in claim 3 in which the shaft is provided with a pair of axially spaced abutments, the sleeve is interposed between the abutments and has a notch at one end, and a spring reacting between one of the abutments and the other end of the sleeve normally seats said notch against the adjacent abutment.

5. In a machine for grading eggs and the like according to weight of the class in which the eggs are moved successively and individually on to each one of a series of weighing station pans each of which is movably mounted and counterweighted so as to start to descend in response to loading with an egg of predetermined weight, the combination with each pan of a pivoted mounting means for the pan, a rotating cam, and a follower carried by the pivoted mounting means and movable into cooperation with the cam on lowering of the pan for forcibly lowering the pan a further distance after it starts to descend.

6. In a machine for grading eggs and the like according to weight of the class in which the eggs are moved successively and individually on to each one of a series of weighing station pans each of which is movably mounted and counterweighted so as to start to descend in response to loading with an egg of predetermined weight, the combination with each pan of means for initially holding the pan against descent through more than a relatively small distance, means pivotally mounting the pan, a rotating cam, and a follower carried by the pivoted mounting means and movable into cooperation with the cam on lowering of the pan for forcibly lowering the pan a further distance after it starts to descend.

7. In a machine for grading objects such as eggs or the like according to weight, feeding mechanism comprising a runway, a pair of abutment elements spaced apart along the runway for trapping between them successively single objects on the runway, each abutment element comprising a pair of pins extending upwardly through an opening in the runway and connected together below the runway, a rocker arm pivoted to said connections, a link having a lost motion connection with said rocker arm, a lever pivoted to said link, an eccentric movable to swing the lever alternately to opposite sides of dead center, and spring means biasing the lever against the eccentric and operative on movement of the lever in either direction past dead center to move the lever quickly in said direction and operative through said lost motion connection to project by snap action one of said abutment elements upwardly and retract the other of said abutment elements downwardly relatively to the runway.

8. In a machine for grading objects such as eggs or the like according to weight, feeding mechanism comprising a runway, a pair of spaced abutment elements extending over the runway for trapping between them successively single objects on the runway, a rocker arm connecting the abutment elements at one end of each and being pivoted between said connections, a link having a lost motion connection with said rocker arm, a lever pivoted to said link, means for moving the lever alternately to opposite sides of dead center, and spring means biasing the lever against the lever-moving means and operative on movement of the lever in either direction past dead center to move the lever quickly in said direction and operative through said lost motion connection to project by snap action one of said abutment elements and retract the other of said abutment elements relatively to the runway into stopping and releasing relation respectively to objects on the runway.

9. In a machine for grading objects such as eggs or the like according to weight, feeding mechanism comprising a runway, a pair of spaced connected abutment elements extending over the runway for trapping between them successively single objects on the runway, a link having a lost motion connection with said abutment elements, a lever pivoted to said link, means for moving the lever alternately to opposite sides of dead center, and spring means biasing the lever against the lever-moving means and operative on movement of the lever in either direction past dead center to move the lever quickly in said direction and operative through said lost motion connection to project by snap action one of said abutment elements and retract the other of said abutment elements relatively to the runway into stopping and releasing relation respectively to objects on the runway.

10. In a machine for grading eggs and like articles according to weight, a plurality of weighing station pans aligned in a series, means moving the articles successively and intermittently onto each of the pans comprising a shaft rotatably mounted adjacent each pan, a finger projecting radially from each shaft for engaging an article in a portion of each turn of the shaft and pushing the article onto the adjacent pan and thereafter in a succeeding portion of the turn of the shaft releasing the article to rest in position on the pan, an element operatively connected to the pan for movement therewith, and a cam driven by the shaft and cooperating with said element for holding the pan against movement while the article is being moved onto the pan and thereafter releasing the element to free the pan for movement after the article is positioned on the pan.

References Cited in the file of this patent

UNITED STATES PATENTS

| Number | Name | Date |
| --- | --- | --- |
| 195,489 | Crompton et al. | Sept. 25, 1877 |
| 1,747,593 | Oates | Feb. 18, 1930 |
| 1,770,810 | Schoonenberg | July 15, 1930 |
| 1,791,096 | Humphrey | Feb. 3, 1931 |
| 1,888,673 | Humphrey | Nov. 22, 1932 |
| 2,003,561 | Studley et al. | June 4, 1935 |
| 2,178,203 | Fausel | Oct. 31, 1939 |
| 2,235,725 | Nordquist | Mar. 18, 1941 |
| 2,235,877 | Guggenheim | Mar. 25, 1941 |
| 2,279,947 | Keen | Apr. 14, 1942 |
| 2,353,539 | Beach | July 11, 1944 |
| 2,357,783 | Snelling | Sept. 5, 1944 |
| 2,442,689 | Hill | June 1, 1948 |

FOREIGN PATENTS

| Number | Country | Date |
| --- | --- | --- |
| 336,328 | Great Britain | Oct. 16, 1930 |
| 390,047 | France | July 18, 1908 |
| 573,714 | France | Mar. 15, 1924 |